United States Patent
Kromm et al.

(10) Patent No.: US 10,118,525 B2
(45) Date of Patent: Nov. 6, 2018

(54) VEHICLE SEATING ASSEMBLY WITH AESTHETIC LEATHER TRIM COVER ASSEMBLY

(71) Applicant: LEAR CORPORATION, Southfield, MI (US)

(72) Inventors: Dorothy Kromm, Lake Orion, MI (US); Lisa Townley, Allen Park, MI (US); Thomas Welch, Jr., Ortonville, MI (US); Sara Russo, Macomb, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 14/867,763

(22) Filed: Sep. 28, 2015

(65) Prior Publication Data

US 2016/0096462 A1    Apr. 7, 2016

Related U.S. Application Data

(60) Provisional application No. 62/059,387, filed on Oct. 3, 2014.

(51) Int. Cl.
*B60N 2/58* (2006.01)
*B60N 2/70* (2006.01)

(52) U.S. Cl.
CPC ......... *B60N 2/7017* (2013.01); *B60N 2/5816* (2013.01)

(58) Field of Classification Search
CPC ...... B60N 2/58; B60N 2/5816; B60N 2/5891; B60N 2/7017; B60N 2/72; A47C 7/18; A47C 7/185; A47C 7/22; A47C 7/24; A47C 7/26
See application file for complete search history.

(56) References Cited

U.S. PATENT DOCUMENTS

| | | | | |
|---|---|---|---|---|
| 4,849,265 A | * | 7/1989 | Ueda | B44C 1/105 428/142 |
| 5,000,805 A | * | 3/1991 | Lowe | B29C 66/436 156/155 |
| 5,254,197 A | * | 10/1993 | Klems | B29C 65/4845 156/272.2 |
| 5,395,473 A | * | 3/1995 | Nixon | B29C 63/22 156/285 |
| 5,486,252 A | * | 1/1996 | Wong | B29C 63/22 156/212 |

(Continued)

FOREIGN PATENT DOCUMENTS

CN    102582488 A    7/2012

OTHER PUBLICATIONS

Chinese First Office Action dated Jun. 14, 2017, Application No. 201510644179.9, Applicant Lear Corporation, 10 Pages.

(Continued)

*Primary Examiner* — Philip F Gabler
(74) *Attorney, Agent, or Firm* — Brooks Kushman P.C.

(57) ABSTRACT

A vehicle seat is provided, in at least one embodiment, comprising a cushion and a leather trim cover assembly disposed over the cushion. In at least this embodiment, the trim cover assembly has a central trim panel assembly secured to at least one peripheral trim panel assembly, and the central trim panel assembly has a leather upper layer and a sub-layer assembly having at least one protruding design secured to the leather upper layer.

20 Claims, 5 Drawing Sheets

(56) References Cited

U.S. PATENT DOCUMENTS

| | | |
|---|---|---|
| 6,786,541 B2 | 9/2004 | Haupt et al. |
| 6,861,019 B2 | 3/2005 | Ali et al. |
| 7,229,129 B2 | 6/2007 | White et al. |
| 7,637,573 B2* | 12/2009 | Bajic .................. B60N 2/56 |
| | | 297/180.1 |
| 7,851,039 B2 | 12/2010 | Boinais et al. |
| 8,398,114 B2 | 3/2013 | Laframboise et al. |
| 8,727,449 B2 | 5/2014 | Laframboise et al. |
| 8,783,768 B2 | 7/2014 | Severinski et al. |
| 2006/0110572 A1* | 5/2006 | Herrero .............. A44B 18/0049 |
| | | 428/100 |
| 2007/0131347 A1 | 6/2007 | Boes et al. |
| 2008/0169678 A1* | 7/2008 | Ishida ................. B29C 49/2408 |
| | | 296/191 |
| 2009/0110941 A1* | 4/2009 | Takezawa ................ B32B 9/02 |
| | | 428/473 |
| 2012/0175935 A1 | 7/2012 | Severinski et al. |
| 2014/0137610 A1 | 5/2014 | Chen et al. |

OTHER PUBLICATIONS

Chinese Second Office Action dated Feb. 24, 2018, Application No. 201510644179.9, Applicant Lear Corporation, 12 Pages.
Chinese Third Office Action dated Aug. 14, 2018, Application No. 201510644179.9, Applicant Lear Corporation, 9 Pages.

* cited by examiner

VEHICLE SEATING ASSEMBLY WITH AESTHETIC LEATHER TRIM COVER ASSEMBLY

CROSS-REFERENCE TO RELATED APPLICATIONS

This application claims the benefit of U.S. provisional application Ser. No. 62/059,387 filed Oct. 3, 2014, the disclosure of which is hereby incorporated in its entirety by reference herein.

TECHNICAL FIELD

The present application is directed to vehicle seating assembly with aesthetic leather trim cover assembly.

BACKGROUND

Vehicle seat assemblies are often fitted with a leather trim cover assembly. Stitching is often provided in leather trim cover assemblies to provide a desirable appearance.

SUMMARY

In at least one embodiment, a vehicle seat assembly is provided comprising a cushion and a leather trim cover assembly disposed over the cushion. In at least this embodiment, the trim cover assembly has a central trim panel assembly secured to at least one peripheral trim panel assembly, with the central trim panel assembly having a leather upper layer and a sub-layer assembly having at least one protruding design secured to the leather upper layer.

In at least another embodiment, a leather trim assembly for a vehicle seat is provided comprising at least one peripheral leather trim panel and a central trim panel assembly secured to the at least one peripheral trim panel to form a trim cover assembly securable over a cushion. In at least this embodiment, the central trim panel assembly has a raised portion having at least one protruding design and a lower portion adjacent the raised portion, with the raised portion having a first thickness and the lower portion having a second thickness lower than the first thickness.

In at least yet another embodiment, a method of making a vehicle seat assembly is provided comprising providing a cushion, providing a leather trim cover assembly comprising a central trim panel assembly secured to at least one peripheral trim panel assembly, with the central trim panel assembly having a leather upper layer and a sub-layer assembly having at least one protruding design secured to the leather upper layer, and disposing the leather trim cover assembly over the cushion.

In at least one embodiment, the leather trim cover assembly can include a central trim panel assembly prepared by providing a spacer layer and a press plate in a mold assembly and molding the spacer layer to provide a formed spacer layer having at least one protruding design. In at least another embodiment, the leather trim cover assembly can be made by placing a pre-formed spacer layer having a protruding design in a mold assembly along with a leather trim panel, a layer of glue disposed between the spacer layer and the leather trim panel, and a press plate disposed between the mold assembly and the leather trim panel, and molding the spacer layer and leather trim panel together to form the central trim panel assembly. In yet another embodiment, the leather trim cover assembly can be made by placing a design assembly having a protruding design in a mold assembly along with a leather trim panel, a layer of glue disposed between the design assembly and the leather trim panel, and a press plate disposed between the mold assembly and the leather trim panel, and molding the design assembly and leather trim panel together to form the central trim panel assembly.

DETAILED DESCRIPTION

As required, detailed embodiments of the present disclosure are disclosed herein; however, it is to be understood that the disclosed embodiments are merely examples of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Moreover, except where otherwise expressly indicated, all numerical quantities in this disclosure are to be understood as modified by the word "about". Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Figure 1:
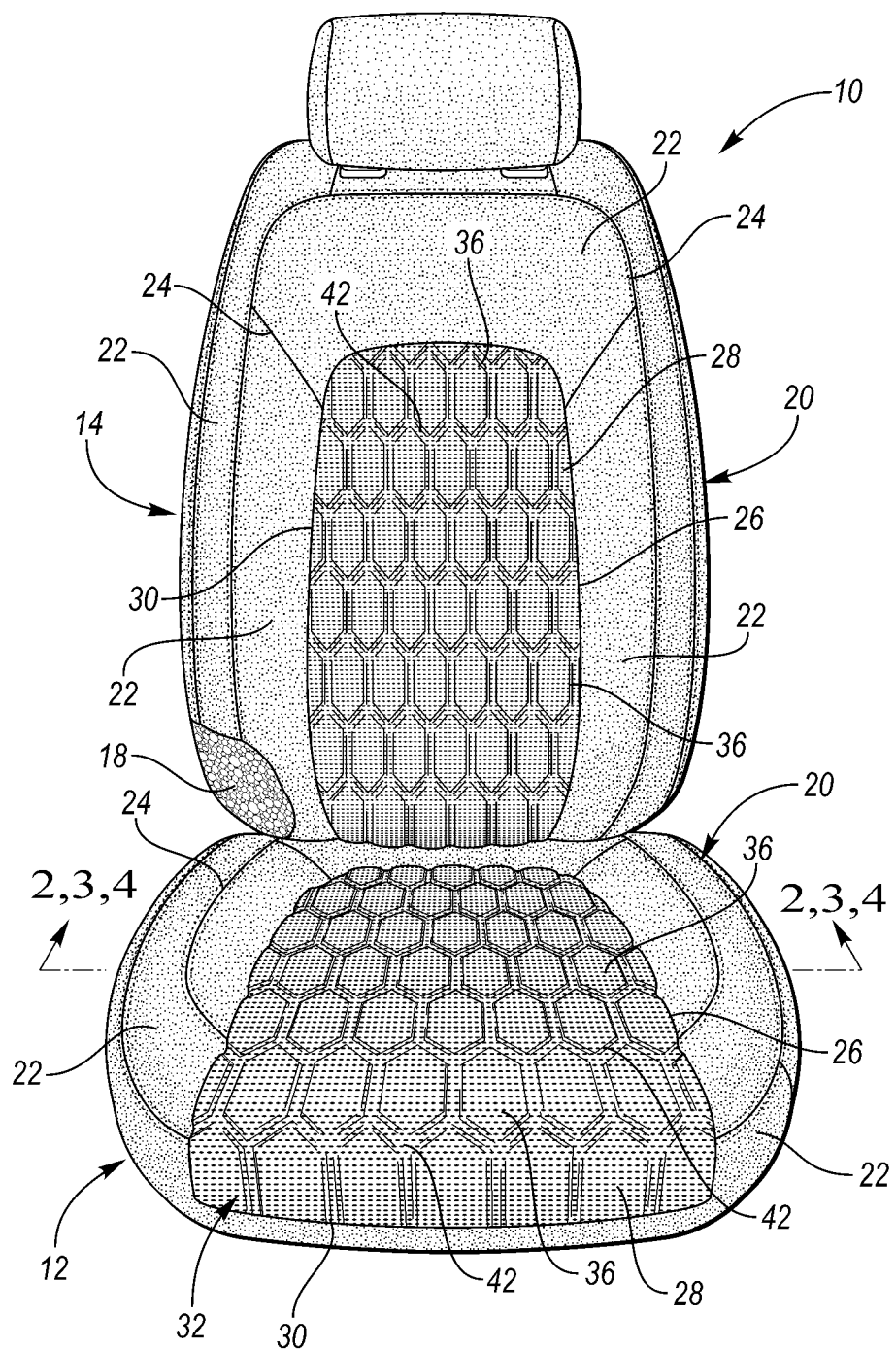
FIG. 1 illustrates a perspective front view of an exemplary vehicle seat assembly in accordance with one embodiment of the present disclosure.

Referring to FIG. 1, an exemplary seat assembly 10 is shown. While the vehicle seat assembly 10 is illustrated in FIG. 1 to be a bucket seat assembly, it should be understood that the principles of the present disclosure are applicable to other types of seat assemblies, such as bench, captain and other seat assemblies. It should also be understood that the principles of the present disclosure are applicable to other vehicle interior trim components where leather is a component such as backrests, back support pads, armrests, and head restraints. Still further, it should also be understood that the principles of this disclosure are applicable to all types of vehicle seat assemblies as well as non-vehicle seat assemblies.

The seat assembly 10 can be configured for use in a vehicle, such as motor vehicle like a car or truck, or for use in non-vehicular applications. The seat assembly 10 includes a seat bottom 12 and a seat back 14 pivotally disposed on the seat bottom 12. The seat bottom 12 is mountable to a surface such as a vehicle floor.

The seat bottom 12 and the seat back 14 each include a seat foam pad 18 (FIGS. 1 and 2) supported on a seat frame (not shown). The seat foam pads 18 are disposed under a trim cover assembly 20. The trim cover assembly 20 provides an exterior seating surface. The trim cover assembly 20 includes a trim cover that is made of a suitable leather material. It should be understood that the cushion 18 for the seat back 14 can differ from the cushion 18 of the seat bottom 12. Likewise, it should be understood that the trim cover assembly 20 for the seat back 14 can differ from the trim cover assembly 20 for the seat bottom 12.

The trim cover assembly 20 can readily be useable in a heat/cool seat assembly 10, but may be equally useable with other types of seat assemblies, such as heat or cool seat assemblies, or non-temperature controlled seat assemblies. The trim cover assembly 20 can have other conventional members such as a thin foam layer and trim attachments, and is attachable to the seat component(s) in any suitable manner, such as by attaching to the frame and/or cushion members.

In at least one embodiment, the trim cover assembly 20 comprises a plurality of trim cover panels that are secured together such that the trim cover assembly 20 has a single opening at the open end into which the seat bottom 12 or the seat back 14 may be inserted. More specifically, trim cover assembly 20 has a plurality of peripheral panels 22 that are stitched, or otherwise secured, together at seams, such as 24 to form a central opening 26. A central panel portion 28 is likewise stitched, or otherwise secured, to the peripheral trim panels 22 at the opening 26 at stitching 30. In at least one embodiment, all of the panels 22 and 28 include at least an outer layer of leather.

In at least the illustrated embodiments, the central trim cover panel 28 has a pattern 32 comprised of a plurality of rows of geometric shaped designs, such as honeycomb-shaped designs 36. While the geometric shape designs are illustrated to be honeycomb shaped designs 36, it should be understood that any suitable design and/or shape can be employed. Moreover, while a plurality of the same shaped and sized designs 36 are shown, it should be understood that the designs 36 could vary in size, shape or appearance. In other words, the designs do not have to be uniform or consistently patterned. Moreover, rather than having a plurality of designs, the central trim cover panel 28 could have one design. While the designs 36 will be referred to herein as a plurality, it should be understood when describing the designs 36, that the same description will apply equally to a central trim cover panel 28 having a singular design.

In at least one embodiment, the trim cover assembly pattern 32 and designs 36 can be made by a waffle application press process (W.A.P.P). As a result, some or all of the designs 36 are raised relative to the adjacent portions 42, which in the illustrated embodiment form channels extending about the designs. In at least one embodiment, the designs 36 independently have a thickness of 3 to 10 mm, and in another embodiment of 4 to 8 mm. In one embodiment, the adjacent portions 42 independently have a thickness of 0.5 to 3 mm and in yet another embodiment of 1 to 2 mm. In certain embodiments, the designs 36 have an average thickness that is 1.5 to 4 times thicker than the average thickness of the adjacent portions 42, and in other embodiments of 2 to 3 times thicker.

Figure 2:
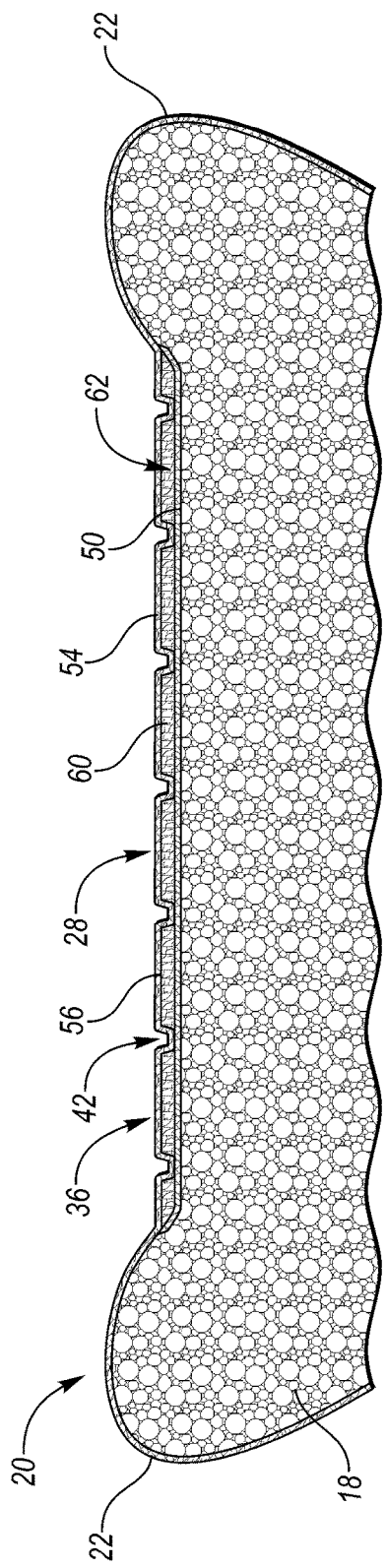
FIG. 2 is a sectional view along line 2-2 of the seat assembly of the present disclosure.

In at least one embodiment, the designs 36 of the central panel portion 28 of the trim cover assembly 20 can providing by a design assembly 62 comprising, at least in the embodiment illustrated in FIG. 2, a plurality of suitable resilient shaped members, such as the illustrated honeycomb-shaped members 60, press-bonded to a leather trim cover 54. In at least one embodiment, the shaped members 60 are made of foam, however the shaped members can be made of any suitable material, such as felt, spacer material, mueller-tex type spacer fabric, elastomeric material, and any other approved materials. In the embodiment illustrated in FIG. 2, the shaped members 60 are supported by a sheet layer 50 which can form part of the design assembly 62. The bonding of the design assembly 62 to the leather trim cover 54, as will be described further below, generally takes place in a mold under a waffle template 70 with the application of relatively high heat. In at least one embodiment, the mold operated under suitable temperature and pressure conditions, such as at 260 to 325° F., at a pressure of 10 to 15 lbs. and for 20 to 40 seconds, to allow the design assembly 62 to bond to the leather trim cover 54.

In at least one embodiment, in a first step, for forming a suitable design assembly 62 is provided a plurality of individual resilient shaped members 60 are provided. The shaped members 60 can be provided or formed in any suitable manner, such as being molded, cut from a suitable sheet layer, or otherwise formed. In at least one embodiment, the individual geometric shaped members 60 can be cut from a layer of any suitable material, such as foam. Any suitable foam can be used, but in at least one embodiment, the foam comprises a high density foam having a density of 35 to 55 g/m$^3$. In other embodiments, such as when the trim cover assembly 20 is used with a temperature controlled seat or where it is desired to promote ventilation, the shaped members 60 can be made of an air permeable material, such as Mueller Textil type spacer materials, foam members with perforations, plastic members with perforations, or the like. In certain embodiments, the shaped members 60 can have an air permeability suitable to provide a desired level of air flow.

The shaped members 60 can have any suitable shape, size, width, length and/or thickness. In some embodiments, the shaped members 60 have a thickness of 2 to 12 mm, and in other embodiments of 6 to 10 mm, before being provided in the trim cover assembly 20, and of 0.5 to 10 mm, and in other embodiments of 1 to 5 mm, in the finished trim cover assembly 20. In some embodiments, the shaped members 60 have a width and/or length of 0.1 to 5 cm, and in other embodiments of 0.5 to 1.5 cm. The shaped members 60 can be spaced apart any suitable distance and in any suitable pattern and in at least one embodiment are spaced apart 0.02 to 5 cm in an offset row pattern, in other embodiments 0.05 to 1.5 cm in an offset row pattern, and in yet other embodiments 0.1 to 0.5 cm in an offset row pattern.

Next, the individual shaped members 60 can be arranged in rows and secured to, such as by glue or any other suitable manner, to the sheet layer 50. The sheet layer 50 can be made of any suitable material, such as fabric, spacer fabric, such as are available from Mueller Textil and Guilford Mills, polyester knit, faux suede, polyester spacer material, to name a few. In certain embodiments, the spacer fabric may be a layer or multiple layers formed from polyester fleece, reticulated foam, or woven material. Additionally, the spacer fabric may be formed from any material having a relatively high air permeability, allowing air to flow in all directions.

The sheet layer 50 can have any suitable thickness, but in at least one embodiment has thicknesses of 1 to 15 mm, in other embodiments of 1.5 to 12 mm, and in yet other embodiments of 2 to 10 mm. In certain other embodiments, the sheet layer 50 has a thickness of 5-20 mm, and in other embodiments of 6-15 mm. In certain other embodiments, the sheet layer 50 comprises 1.5 to 3.0 lbs. polyester foam.

In embodiments where the shaped members 60 are cut from a sheet material, such as foam, the individual shaped members 60 can be cut from the layer of foam in rows, such as by being pattern cut with a Gerber-type machine, or any suitable cutting device, such as a die, and the cut layer of foam having holes can be removed to leave the rows of honeycomb-shaped members 60 on the sheet layer 50. In other embodiments, the shaped-members 60 can be separately formed, such as by molding, and provided on the sheet layer 50. Glue, other adhesive, or other suitable manners can be employed to secure the shaped members 60 to the sheet layer 50.

Figure 3:
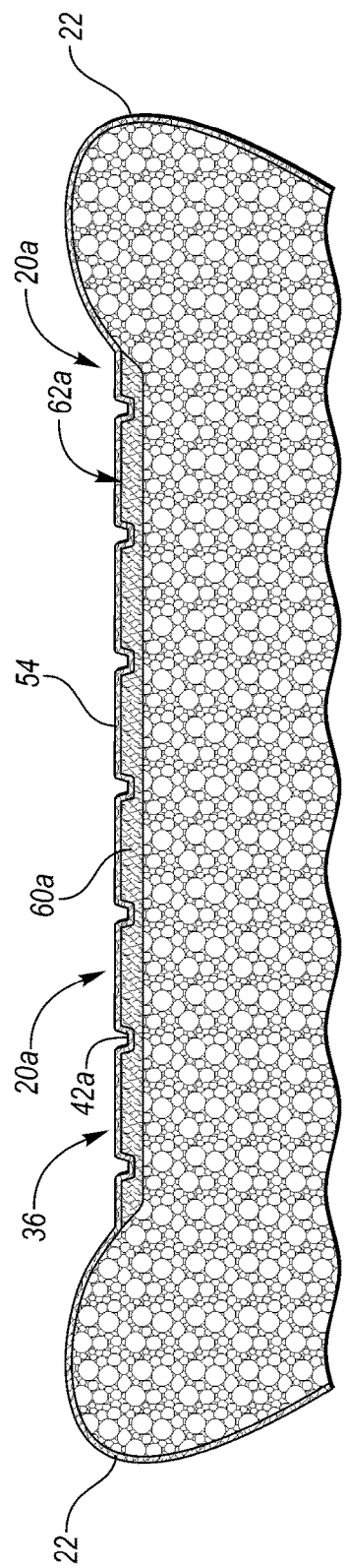
FIG. 3 is a view similar to FIG. 2 showing another seat assembly of the present disclosure.

In another embodiment, as best illustrated in FIG. 3, another trim cover assembly 20a is shown. The trim cover assembly 20a is generally similar in design and construction to the trim cover assembly 20 illustrated in FIG. 2, except that an integrally formed design assembly 62a is employed, rather than the multi-part constructed design assembly 62 of FIG. 2. In this embodiment, like the embodiment shown in FIG. 2, the design assembly 62a is suitably secured to the layer of leather 54. In at least the embodiments shown in FIGS. 3 and 5, the design assembly 62a is made of one material. The design assembly 62a can be made of any suitable material, such as foam, plastic, and spacer material, to name a few. Any suitable spacer material can be used, such as Mueller Textil type and Guilford Mills spacer material. In at least certain embodiments, the design assembly 62a can be made of the same material and have the same thickness as the sheet layer 50 described above.

Figure 5:
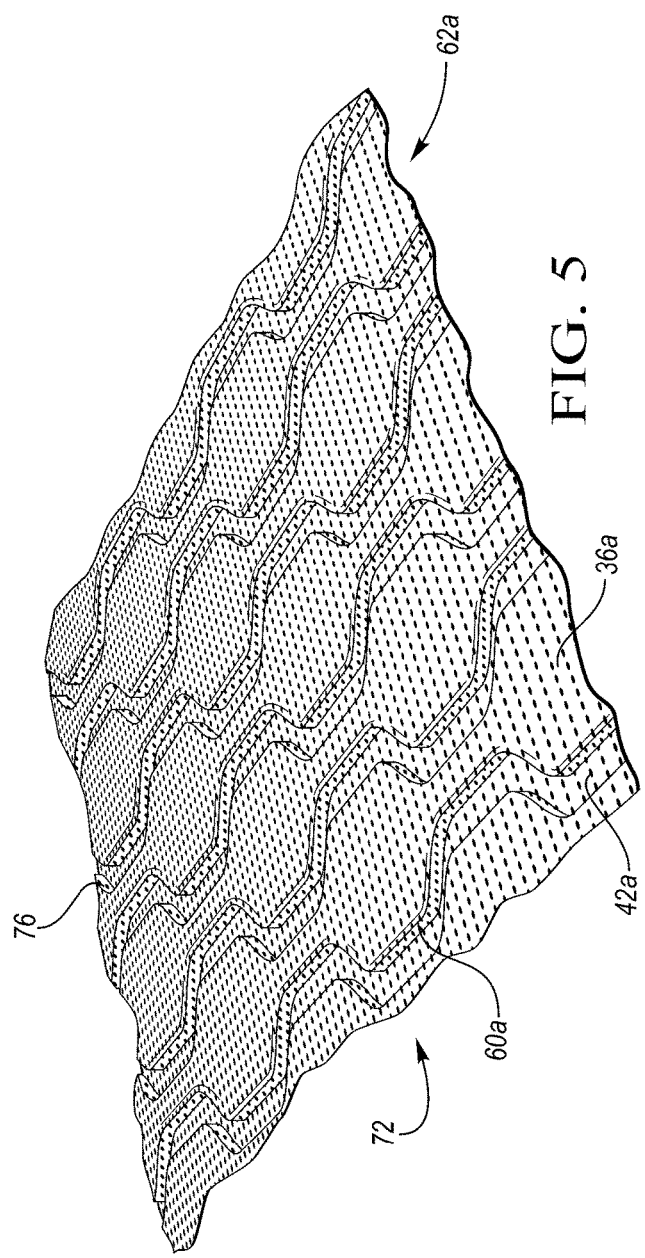
FIG. 5 is a perspective view of a component of a vehicle seat assembly in accordance with an embodiment of the present disclosure.

Referring to FIG. 5, an exemplary design assembly 62a of FIG. 3 is illustrated in perspective view. Making reference to the design assemblies 62a illustrated in FIGS. 3 and 5, the shaped members 60 can be provided in the form of a sheet of material 72, such as foam or air permeable material, that has been etched, routed, or otherwise machined to provide a pattern of shaped members 60. In still yet even other embodiments, the shaped members 60 can comprise a sheet 72 having shaped members 60 formed therein, such as by molding and/or pressing. In one embodiment, the molding can take place in a RF (Radio Frequency) mold. In the embodiment illustrated in FIG. 5, the shaped members 60 and the adjacent portions of the illustrated sheet material 72 have holes 76 therein. However, it should be understood that the holes 76 can be optional such as when used with non-temperature controlled seats. Furthermore, it should be understood that the holes 76 can be optional on some or all of the shaped member 60 and/or the adjacent portions 42 to provide a desired air permeability to the design assembly.

In one embodiment, the design assembly 62a can be made using a waffle application press process (W.A.P.P). Making reference to FIG. 7, an exemplary method for making one embodiment of the design assembly 62a is schematically illustrated. A suitable mold assembly 64, such as the illustrated one having an upper mold half 64a and a lower mold half 64b is provided. A suitable waffle template 70 is also provided along with a sheet layer 66. The sheet layer 66 can have any suitable material and construction, and can have the same construction, the same thickness and/or be made of the same material as sheet layer 50 described above.

Figure 6:
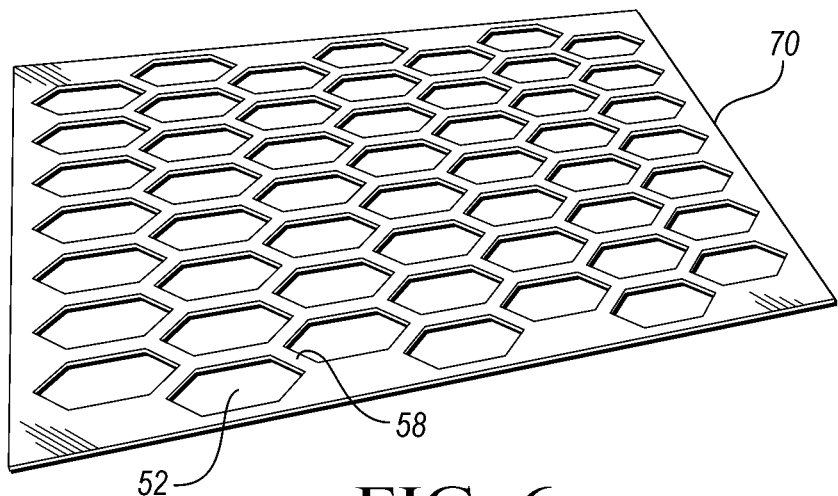
FIG. 6 is a perspective view of a component used to make a vehicle seat assembly in accordance with an embodiment of the present disclosure.

Making reference to FIG. 6, an exemplary waffle template 70 is schematically illustrated. The waffle template 70 can be made of a suitable material, such as aluminum, brass and other metals. As best shown in FIG. 6, the template 70 has shaped openings 52 within aluminum wall members 58. The openings 52 are generally the same shape and slightly larger, such as (2 to 10%), than the shape and size of the shaped members 60 to account for the material thickness stack up. The waffle template 70 can have any suitable thickness, and in at least one embodiment has a thickness of 0.5 to 3 mm, and in another embodiment of 1 to 2.5 mm. The waffle template 70 can be secured to, or adjacent to, one of the mold half 64a and 64b. Alternatively, the waffle template 70 can be integral with one of the mold half 64a and 64b.

Figure 7:
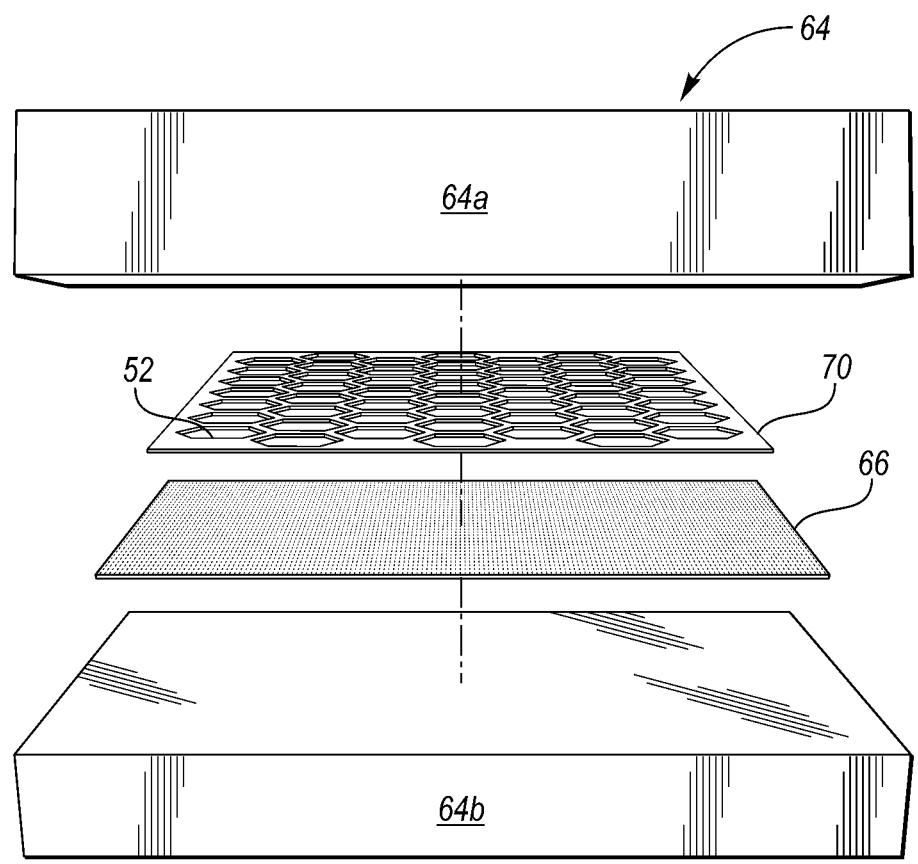
FIG. 7 is a schematic illustration of a method useable to make a component of a seat assembly in accordance with an embodiment of the present disclosure.

In at least one embodiment, as schematically shown in FIG. 7, the sheet layer 66 can be disposed in the mold assembly 64 disposed between the template 70 and a half 64a and 64b and the mold 64 can then be closed with application of relatively high heat. In at least one embodiment, the mold 64 is a RF (Radio Frequency) mold and can be operated under suitable temperature and pressure conditions, such as at 150° to 450° C., at a pressure of 10 to 50 lbs., and for 2 to 45 seconds, to allow the designs 60a and adjacent portions 42a to form in the design assembly 62a. In at least one embodiment, the mold 64 can be operated at 200° to 300° C., a pressure of 20 to 30 lbs., and for 15 to 25 seconds, to allow the designs 60a and adjacent portions 42a to form in the design assembly 62a. In at least one embodiment, the RF mold assembly 64 operates at a Plate DC amps of 4000 to 6000, a Plate Kilovolts of 6000 to 8000, and a RF peak volts of 2500 to 4500. In at least another embodiment, the RF mold assembly 64 operates at a Plate DC amps of 4500 to 5500, a Plate Kilovolts of 6500 to 7500, and a RF peak volts of 3000 to 4000. When using a RF mold assembly, a magnetic field is generated to melt the material. The designs 60a and adjacent portions 42a are similar in size and shape as the designs 60 and adjacent portions 42 set forth above.

As shown in the embodiment illustrated in FIG. 2, a layer of glue, or other suitable adhesive 56 or securing mechanism is disposed between the leather 54 and the design assembly 62. In at least one embodiment, preferably glue 56 that crystallizes when applied with high heat is employed to adhere the design assembly 62 to the leather trim cover 54. In certain embodiments, the glue 56 is a polyamide spun fab web adhesive having a weight of 0.5 to 1.0 oz.

Figure 8:
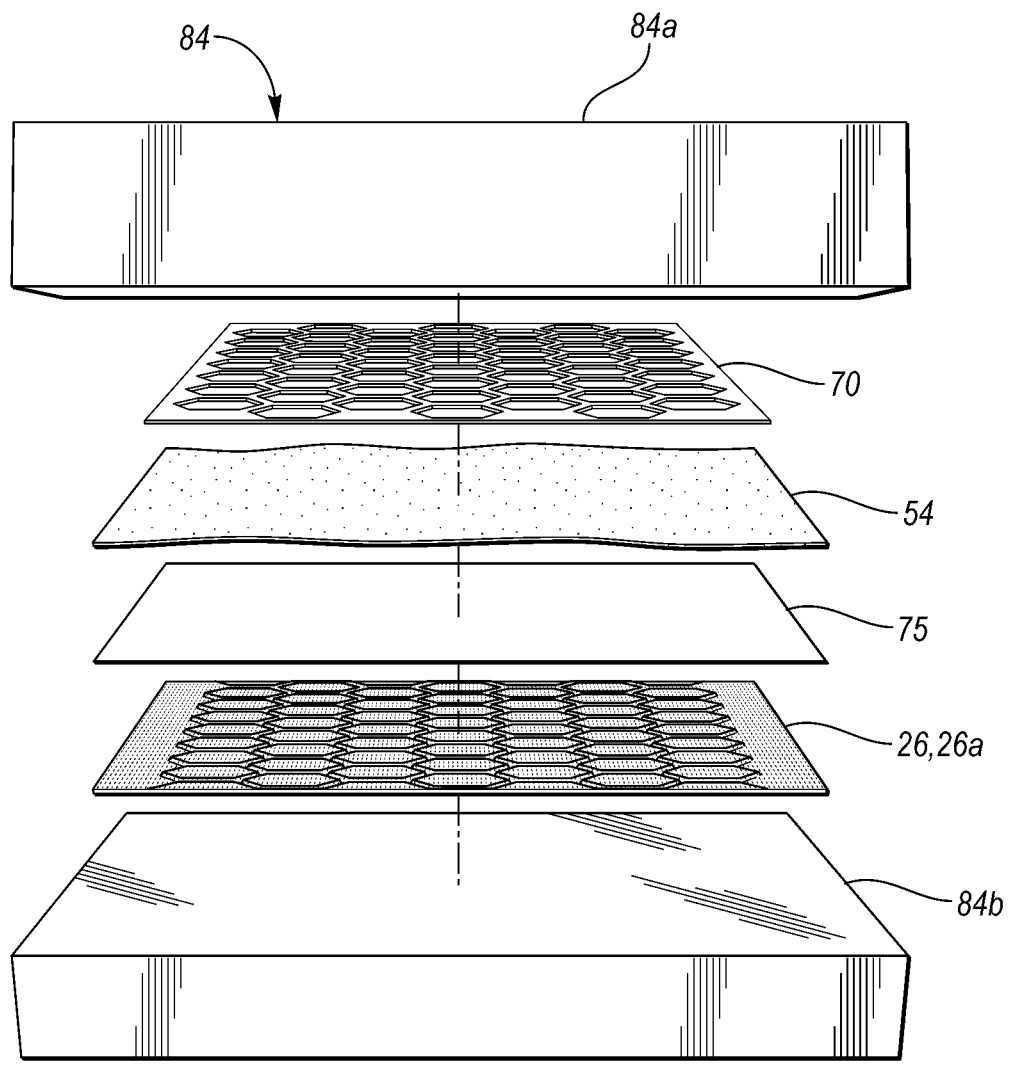
FIG. 8 is a schematic illustration of a method useable to make a seat assembly in accordance with an embodiment of the present disclosure.

In one embodiment, the trim cover assembly 20 can be made using a waffle application press process (W.A.P.P). Making reference to FIG. 8, an exemplary method for making one embodiment of the central panel portion 28 of the trim cover assembly 20 is schematically illustrated. A suitable mold assembly 84, such as the illustrated one having an upper mold half 84a and a lower mold half 84b is provided. In at least one embodiment, the mold assembly is a conventional heat mold. A suitable waffle template 70, similar in design and construction as described above, is also provided along with the design assembly 62 and a layer of leather 54. As schematically illustrated in FIG. 8, the waffle template 70 is disposed between mold half 84a and leather 54, glue or any suitable adhesive 75 is disposed between design assembly 62 and the leather 54, with the design assembly 62 being between the bottom mold 84b and the glue 75, however any suitable arrangement could be provided. In certain embodiments, the glue 75 is a polyamide spun fab web adhesive having a weight of 0.5 to 1.0 oz. In at least one embodiment, the layer of leather 54 is loosely laid on the design assembly 62. While it should be understood that the layer of leather 54 can have any suitable shape and/or size, in at least one embodiment the leather layer 54 has a thickness of 0.5 to 10 mm, in other embodiments of 0.75 to 5 mm, and in yet other embodiments of 1 to 3 mm.

As best understood making reference FIG. 8, the leather layer 54, the adhesive 75, the design assembly 62 and the waffle template 70 are placed into the mold 84 and compressed under pressure and heat for a suitable time and under suitable conditions, such as at 260 to 325° F., at a pressure of 10 to 15 lbs. and for 20 to 40 seconds, to allow the design assembly 62 to bond to the leather trim cover 54. The template 70 stays on top of the leather layer 54 pressing down the design into the leather layer 54 to adhere the glue 75 or any other suitable adhesive to the design assembly 62 to provide the desired shape and depth of the final design of the central panel portion 28 of the trim cover assembly 20. The central panel portion 28 is then secured to the panels 22 to form the trim cover assembly 20. The central portion 28a of the trim cover assembly 20a illustrated in FIG. 3 is made in essentially the same manner as described above for trim cover assembly 20 except that design assembly 62a replaces design assembly 62.

Figure 4:
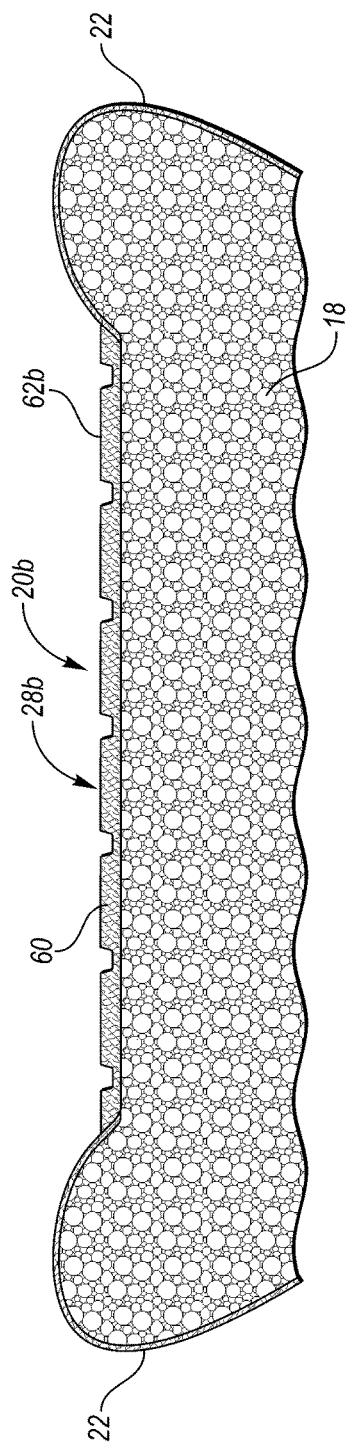
FIG. 4 is a view similar to FIG. 2 showing yet another seat assembly of the present disclosure.

A further embodiment of a trim cover assembly 20b is illustrated in FIG. 4. In this embodiment, the trim cover assembly 20b comprises a plurality of peripheral trim panels 22 made of leather, similar to the peripheral panels illustrated in FIGS. 2 and 3 and a central panel portion 28b secured to the panels 22 to form the trim cover assembly 20b. The central panel portion 28b is similar in design and construction to the central trim panels 28 and 28a except that it does not have a top layer of leather or an adhesive layer. In certain embodiments, the central panel portion 28b is identical to the design assembly 62a illustrated in FIGS. 3 and 5. In making the trim cover assembly 20b of FIG. 4, the central panel portion 28b is made in similar fashion as described above with respect to the integrally formed design assembly 62a, and the central panel portion 28b is secured to the peripheral leather trim panels 22 in the similar manner as the central panel portions 28 and 28a as described above.

The details, designs, variants, aspects and embodiments shown and described herein are applicable to automotive, other vehicular, and non-regulated seating. While exemplary embodiments are described above, it is not intended that these embodiments describe all possible forms of the disclosure. For instance, the shaped protrusions in the layer of leather can have a sewn pattern of thread outlining the protrusions. Rather, the words used in the specification are words of description rather than limitation, and it is understood that various changes may be made without departing from the spirit and scope of the disclosure. Additionally, the features of various implementing embodiments may be combined to form further embodiments of the disclosure. It should be understood that the present disclosure contemplates a seat system or a thoracic region support seating system comprising any combination of features shown in the figures and/or described in the application.

What is claimed is:

1. A vehicle seat assembly comprising:
   a cushion; and
   a leather trim cover assembly disposed over the cushion, the trim cover assembly having a central trim panel assembly secured to at least one peripheral trim panel assembly, the central trim panel assembly having a leather upper layer and a sub-layer assembly having a plurality of spaced apart resilient geometric shaped protrusions adhesively bonded to the leather upper layer.

2. The vehicle seat of claim 1 wherein the leather upper layer is secured to the sub-layer assembly such that the plurality of protrusions are pressed against the leather upper layer so that the leather upper layer protrudes in the area of the at least one protruding design.

3. The vehicle seat of claim 2 wherein the plurality of protrusions have a similar shape.

4. The vehicle seat of claim 3 wherein the plurality of protrusions includes at least two rows of evenly spaced protrusions, with each row having a plurality of protrusions.

5. The vehicle seat of claim 4 wherein the sub-layer assembly includes an underlay supporting the protrusions, with the protrusions being separate from each other, the underlay and the protrusions not being sewn to the leather upper layer.

6. The vehicle seat of claim 5 wherein the protrusions are made of foam and have a thickness of 0.5 to 10 mm and a width of 0.1 to 5 cm and a length of 0.1 to 5 cm.

7. The vehicle seat of claim 4 wherein the protrusions are integrally formed in the sub-layer assembly.

8. The vehicle seat of claim 7 wherein the sub-layer comprises a composite comprising a scrim layer, a mesh layer and a layer of monofilament extending between and connected to the mesh and monofilament layers.

9. The vehicle seat assembly of claim 7 wherein the sub-layer assembly comprises an air-permeable spacer layer.

10. The vehicle seat of claim 1 wherein the leather upper layer includes a first set of perforations and the sub-layer assembly includes a second set of perforations in fluid communication with the first set of perforations.

11. The vehicle seat of claim 1 wherein the at least one peripheral trim panel assembly includes a first leather trim panel sewn to a first side of the central trim panel assembly and a second leather trim panel sewn to a second side of the central trim panel assembly opposite the first side.

12. A leather trim assembly for a vehicle seat assembly, the trim assembly comprising:
   at least one peripheral leather trim panel; and
   a central trim panel assembly secured to the at least one peripheral trim panel to form a trim cover assembly securable over a cushion, the central trim panel assembly having a raised portion having at least one protruding design and a lower portion adjacent the raised portion, with the raised portion having a first thickness and the lower portion having a second thickness lower than the first thickness, wherein the central trim panel assembly includes a leather trim sheet having an upper surface facing away from the cushion and a lower surface facing the cushion, and a non-leather layer having at least one protruding design, the non-leather layer being adhered to the lower surface of the leather trim sheet.

13. The trim assembly of claim 12 wherein the leather trim sheet is secured to the non-leather layer such that the at least one protruding design is pressed against the leather trim sheet so that the leather trim sheet protrudes in the area of the at least one protruding design, the at least one protruding design comprising a plurality of protrusions having a similar shape spaced apart and supported on the non-leather layer.

14. The trim assembly of claim 12 wherein the at least one protruding design includes a plurality of protrusions having a similar shape arranged in at least two offset rows of evenly spaced protrusions.

15. The trim assembly of claim 14 wherein the non-leather layer includes an underlay, the protrusions being separate from each other and secured to the underlay, with the protrusions being pre-formed and made of foam.

16. The trim assembly of claim 14 wherein the protrusions are integrally formed in the non-leather layer via a press-forming operation.

17. The trim assembly of claim 16 wherein the non-leather layer comprises a composite comprising a scrim layer, a mesh layer and a layer of monofilament extending between and connected to the mesh and monofilament layers.

18. A method of making a vehicle seat assembly, said method comprising:
providing a cushion;
providing a trim cover assembly comprising a peripheral trim panel assembly and a central trim panel assembly secured to and disposed inward of the peripheral trim panel assembly, with the central trim panel assembly having a plurality of protruding designs, with each design being surrounded by an adjacent portion having a thickness less than the thickness of the protruding design, with the plurality of protruding designs not being formed by sewing the trim cover, the plurality of protruding designs being formed by disposing adhesive between a plurality of spaced apart shaped members and the central trim panel and adhesively bonding the shaped members via a plate having shaped openings to the central trim panel, the shaped openings having similar shapes as the shaped members; and
disposing the trim cover assembly over the cushion.

19. The method of claim 18 wherein the central trim panel assembly comprises a trim panel disposed over, and secured to, the plurality of protruding designs and the adjacent portions.

20. The method of claim 19 wherein the shaped members are made of an air permeable spacer material.

* * * * *